Figure 1:
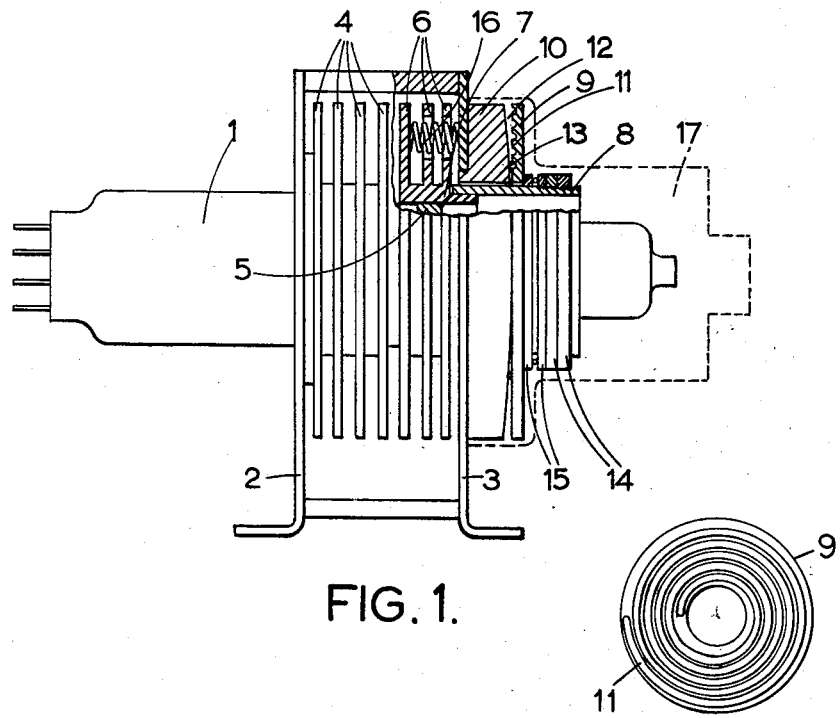

May 7, 1957

J. COLLARD 2,791,754

MECHANISM FOR CONVERTING ANGULAR MOVEMENT
INTO AXIAL MOVEMENT

Filed March 30, 1954

INVENTOR
J. Collard
ATTORNEYS

United States Patent Office 2,791,754
Patented May 7, 1957

2,791,754

MECHANISM FOR CONVERTING ANGULAR MOVEMENT INTO AXIAL MOVEMENT

John Collard, Hammersmith, London, England, assignor to Electric & Musical Industries Limited, Hayes, England, a company of Great Britain Application March 30, 1954, Serial No. 419,867

Claims priority, application Great Britain April 1, 1953

5 Claims. (Cl. 333—83)

This invention relates to mechanism for converting angular movement into axial movement.

In electron discharge devices of the klystron type the cavity resonator of the device is sometimes tuned by causing movement of a wall of the resonator. In some of such devices the total movement of the wall required is very small, say about 15 thousandths of an inch and since such a movement may change the frequency of the resonator by several hundred megacycles and it may be required to adjust the frequency to within one megacycle, a mechanism must be employed for adjusting the position of the resonator wall to the very fine limits which are thus involved.

Various mechanisms have been proopsed for this purpose and such mechanisms have sometimes included differential screws and whilst theoretically such differential screws can afford the necessary small movement, nevertheless in practice inaccuracies which arise in making the threads and the difficulty of ensuring perfect coaxial alignment of the screws lead to erratic movement of the resonator wall and in some cases to actual periodic reversals in the direction of movement. Other tuning mechanisms have been proposed which employ levers in order to obtain the required reduction ratio but since these depend essentially on the employment of a short distance between the fulcrum of the lever and the end thereof which imparts movement to the resonator wall, such devices are again unsatisfactory and it is difficult to manufacture such mechanism with consistent accuracy.

The object of the present invention is to provide an improved mechainsm for converting an angular movement into an axial movement which is particularly suitable for use in tuning mechanisms for electron discharge devices employing resonators but which can be employed for a variety of other purposes.

According to the invention there is provided mechanism for converting angular movement into axial movement, comprising first and second elements mounted about a common axis for relative axial and rotational movements, said elements having opposed surfaces, the distance between which varies in a radial direction and each of said surfaces being a surface of revolution about said axis, a track in one of said surfaces, said track progressively varying in distance from the centre of the surface carrying said track, a follower guided by said track and in engagement with said surfaces whereby relative angular movement imparted to said elements displaces said follower radially thereby causing relative axial movement of said elements. Preferably said track is in the form of a spiral groove of arcuate form in cross-section and is formed on a plane surface of one of said elements and preferably the other element has a frusto-conical surface (although the reverse arrangement may be used) and the follower comprises one or more balls.

Figure 1A:
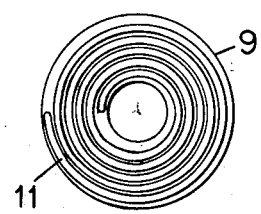
Figure 2:
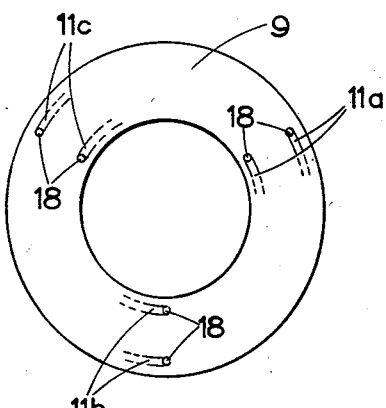
Figure 3:
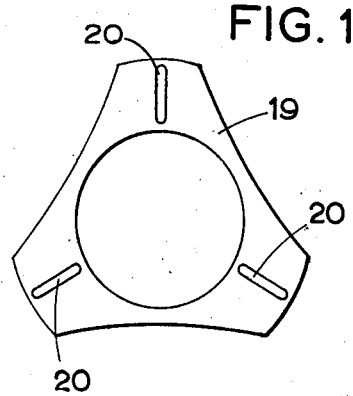

In order that the said invention may be clearly understood and readily carried into effect, one embodiment thereof will now be described with reference to the accompanying drawings as applied to a tuning mechanism for a klystron and in which:

Figure 1 illustrates the tuning mechanism mounted on a klystron and shown partly in section, Figure 1a is a front elevation on a different scale of one of the elements shown in Figure 1, Figure 2 is a front elevation of a modified form of one of the elements of the tuning mechanism shown in Figure 1, and Figure 3 is a detailed view of a cage which may be employed in the mechanism shown in Figure 1.

As shown in Figure 1, the invention is embodied in a tuning mechanism for an electron discharge device of the klystron type indicated at 1, which is provided with a cavity resonator (not shown), one wall of which is adapted to be moved axially for tuning the resonator. The actual details of the klystron and its resonator are not relevant to the invention and they can be of any known or suitable type. The klystron is mounted between a pair of brackets 2 and 3 between which are arranged a number of cooling fins 4 arranged in thermal relation to one part of the resonator. The movable wall of the klystron is provided with a copper ring 5 to which further cooling fins 6, which project from a sleeve 7, are attached. The sleeve 7 is fixed to a further sleeve 8 so that axial movement of the sleeve 8 causes movement of said wall, which is attached to the ring 5 so that tuning of the resonator can be effected. In order to impart axial movement to the sleeve 8, tuning mechanism in accordance with the invention is employed which comprises a pair of elements 9 and 10 each in the form of a disc surrounding the sleeve 8. The element 9 is mounted for angular movement whilst the element 10 is fixed to the bracket 3. The face of the element 9 is provided with a track in the form of a spiral groove 11, whilst the face of the element 10 which opposes the grooved surface of the element 9 is provided with a conical surface indicated at 12. A follower is provided co-operating with said track and in engagement with the conical surface 12, said follower being in the form of a steel ball 13. The two elements 9 and 10, with the ball 13 between them, are held in axial relationship by means of a pair of locking rings 14 which are screw-threaded on to the end of the sleeve 8, a thrust bearing 15 being provided between the element 9 and the locking rings 14. Between the left-hand cooling fin 6 and the inner surface of the bracket 3 a plurality of compression springs 16 are provided, only one of which is shown in Figure 1, although preferably three such springs are employed equidistantly disposed about the axis of the device. Alternatively, a single leaf or disc spring might be used arranged between the right-hand fin 6 and the bracket 3 or a single helical spring may be employed surrounding the axially moving sleeve 8. It will be appreciated that the distance apart between the opposed surfaces of the elements 9 and 10 varies in a radial direction due to the provision of the conical surface 12, and that on rotation of the element 9 the ball 13 is caused to move along the spiral groove 11 and thus the distance apart of the elements 9 and 10 will be varied according to the radial position of the ball 13. Hence, as the ball 13 is caused to move along the groove 11, the springs 16 will compress or expand according to the direction of rotation of the element 9 with the result that the sleeve 8 will move in an axial direction and will communicate such axial movement to the copper ring 5 so effecting tuning of the resonator.

In one specific example where it is desired to impart an axial movement of 15 thousandths of an inch, the apical angle of the conical surface 12 may be about 178° and the spiral groove may comprise fifteen turns occupying a radial distance of one inch. In order to rotate the element 9, a cap 17 indicated in dotted lines may be employed, the cap being secured to the element 9 and also serving as a housing. Alternatively, the element 9 can be rotated through the medium of gearing.

Preferably the groove 11 is of arcuate form in cross-section as shown in Figure 1 and in this case the ball 13 has a radius corresponding to that of the arcuate groove.

Alternatively, the groove may have a flat bottom and the follower may be of a frusto-conical form. It is desirable that the thrust imparted to the axially movable element should be balanced, in which case it is preferred to employ a plurality of followers, say three, which are disposed equiangularly about the axis of the mechanism.

It will be appreciated that where a plurality of followers are employed the radial distances of the followers from the axis of the mechanism will be different and whilst the resultant slight tilting of the second element may be tolerated as a result of manufacturing clearances, nevertheless, in some cases it may be desirable to employ followers of different diameters in order to avoid this resultant tilting. Preferably, however, where three followers are employed separate tracks 11a, 11b, 11c are provided as shown in Figure 2, one for each follower, these tracks being formed in the manner of a triple lead thread, each track commencing 120° away from the other. The limits of rotation of the element 9 are defined by projecting pins 18 with which the followers can engage.

In order to maintain the followers in their positions of 120° apart, a cage 19 may be employed, as shown in Figure 3, the cage having three radial slots 20 in which the followers are retained in their correct angular relationship.

It is preferred that the surface in which the track or tracks is, or are, formed should be plane and the opposing surface of conical form, although the latter surface may in cross-section be of curvilinear or other suitable form so as to afford a required tuning law, or the configuration of the track or tracks may be other than a true spiral for this purpose.

Although the invention is particularly suitable for use in the tuning of cavity resonators, it will be appreciated that the invention can be employed in other devices such as for imparting movement in a lifting mechanism or in a press.

What I claim is:

1. Mechanism for converting angular movement into axial movement, comprising first and second elements mounted about a common axis for relative axial and rotational movements, said elements having opposed surfaces, the distance between which varies in a radial direction and each of said surfaces being a surface of revolution about said axis, a track in one of said surfaces, said track progressively varying in distance from the centre of the surface carrying said track, a follower guided by said track and in engagement with said surfaces whereby relative angular movement imparted to said elements displaces said follower radially thereby causing relative axial movement of said elements.

2. Mechanism for converting angular movement into axial movement comprising first and second elements mounted about a common axis for relative axial and rotational movements, said elements having opposed surfaces the distance between which varies in a radial direction and each of said surfaces being a surface of revolution about said axis, a track in one of said surfaces said track progressively varying in distance from the centre of the surface carrying said track for more than one convolution, a follower guided by said track and in engagement with said surfaces whereby continued relative angular movement imparted to said elements for more than one revolution displaces said follower radially, thereby causing continuous relative movement of said elements in the same axial direction.

3. Mechanism for converting angular movement into axial movement comprising first and second elements mounted about a common axis for relative axial and rotational movements, said elements having opposed surfaces and one of said surfaces being substantially conical, a substantially spiral track in one of said surfaces said track having more than one convolution, a follower guided by said track and in engagement with said surfaces, whereby continued relative angular movement imparted to said elements for more than one revolution displaces said follower radially, thereby causing continuous relative movement of said elements in the same axial direction.

4. Mechanism for converting angular movement into axial movement comprising first and second elements mounted about a common axis for relative axial and rotational movements, said elements having opposed surfaces the distance between which varies in a radial direction and each of said surfaces being a surface of revolution about said axis, a plurality of tracks in one of said surfaces, each track progressively varying in distance from the centre of said surface carrying said tracks for more than one convolution, and each track commencing at a point equiangularly from another track, a follower in each of said tracks, said followers being equiangularly disposed and in engagement with said surfaces whereby continued relative angular movement imparted to said elements for more than one revolution displaces said followers radially thereby causing continuous relative movement of said elements in the same axial direction.

5. A tuning mechanism for an electron discharge device having a cavity resonator, comprising a first element mounted for angular movement, a second element mounted for axial movement and connected to said cavity resonator, said elements having opposed surfaces the distance between which varies in a radial direction and each of said surfaces being a surface of revolution, a track in one of said surfaces, said track progressively varying in distance from the centre of the surface carrying said track for more than one convolution, a follower guided by said track and in engagement with said surfaces whereby continued angular movement imparted to said first element for more than one revolution displaces said follower radially, thereby moving said second element continuously in the same axial direction to tune said resonator.

References Cited in the file of this patent
UNITED STATES PATENTS
1,088,242   Rudolph _____ Feb. 24, 1914